(12) United States Patent
Ito et al.

(10) Patent No.: US 9,835,107 B2
(45) Date of Patent: Dec. 5, 2017

(54) MONITORING DEVICE FOR FUEL INJECTION QUANTITY CONTROL DEVICE

(71) Applicant: TOYOTA JIDOSHA KABUSHIKI KAISHA, Toyota-shi (JP)

(72) Inventors: Yoshiyasu Ito, Toyota (JP); Takuya Inamasu, Kariya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 29 days.

(21) Appl. No.: 14/993,692

(22) Filed: Jan. 12, 2016

(65) Prior Publication Data

US 2016/0208727 A1  Jul. 21, 2016

(30) Foreign Application Priority Data

Jan. 15, 2015  (JP) ................................ 2015-005858

(51) Int. Cl.
*F02D 41/26* (2006.01)
*F02D 41/22* (2006.01)
(Continued)

(52) U.S. Cl.
CPC ......... *F02D 41/263* (2013.01); *F02D 41/221* (2013.01); *F02D 41/247* (2013.01);
(Continued)

(58) Field of Classification Search
CPC .... F02D 41/263; F02D 41/221; F02D 41/247; F02D 41/402; F02D 41/3845;
(Continued)

(56) References Cited

U.S. PATENT DOCUMENTS

| 8,290,687 B2* | 10/2012 | Olbrich | ............... F02D 41/2438 123/299 |
| 2005/0109322 A1* | 5/2005 | Asano | ................. F02D 41/1498 123/436 |

(Continued)

FOREIGN PATENT DOCUMENTS

| DE | 10 2008 040 227 A1 | 1/2010 |
| JP | 2003-120371 A | 4/2003 |
| JP | 2007-327341 | 12/2007 |
| JP | 2009-57911 A | 3/2009 |
| JP | 2013-238203 | 11/2013 |

*Primary Examiner* — Joseph Dallo
*Assistant Examiner* — Yi-Kai Wang
(74) *Attorney, Agent, or Firm* — Oblon, McClelland, Maier & Neustadt, L.L.P.

(57) ABSTRACT

A microcomputer determines a presence of an abnormality of a fuel injection quantity control device based on a comparison between a required injection quantity as a command value for the amount of a fuel injected from an injector in one engine cycle and a total monitor injection quantity as a total value of monitor injection quantities obtained from an energization time monitor value of the injector for each fuel injection in the one engine cycle. The microcomputer removes a micro-injection correction amount from the monitor injection quantity when the monitor injection quantity is below a determination value and executes a removal processing in which the removal of the micro-injection correction amount from the monitor injection quantity is not performed when the monitor injection quantity is at least the determination value. The total value of the monitor injection quantities after the removal processing is regarded as the total monitor injection quantity.

4 Claims, 6 Drawing Sheets

(51) Int. Cl.
*F02D 41/24* (2006.01)
*F02D 41/40* (2006.01)
*F02D 41/38* (2006.01)

(52) U.S. Cl.
CPC ........ F02D 41/402 (2013.01); *F02D 41/3845* (2013.01); *F02D 41/3863* (2013.01); *F02D 2200/0602* (2013.01); *F02D 2200/0614* (2013.01); *Y02T 10/44* (2013.01)

(58) Field of Classification Search
CPC ......... F02D 41/3863; F02D 2200/0602; F02D 2200/0641
USPC ........................................................ 701/104
See application file for complete search history.

(56) References Cited

U.S. PATENT DOCUMENTS

| | | |
|---|---|---|
| 2008/0009999 A1 | 1/2008 | Sugiyama |
| 2008/0017173 A1* | 1/2008 | Fujii ................... F02D 41/1497 123/478 |
| 2009/0063020 A1* | 3/2009 | Ishizuka ............. F02D 41/2438 701/104 |
| 2010/0017100 A1* | 1/2010 | Yamamoto .......... F02D 41/2438 701/104 |
| 2011/0106409 A1 | 5/2011 | Walter et al. |
| 2012/0152203 A1 | 6/2012 | Porten et al. |
| 2015/0073682 A1* | 3/2015 | Ito ....................... F02D 41/1402 701/104 |

* cited by examiner

MONITORING DEVICE FOR FUEL INJECTION QUANTITY CONTROL DEVICE

INCORPORATION BY REFERENCE

The disclosure of Japanese Patent Application No. 2015-005858 filed on Jan. 15, 2015 including the specification, drawings and abstract is incorporated herein by reference in its entirety.

BACKGROUND OF THE INVENTION

1. Field of the Invention

The invention relates to a monitoring device for a fuel injection quantity control device.

2. Description of Related Art

In an engine that is mounted in a vehicle or the like, a fuel injection quantity control for engine output adjustment is performed through a fuel injection quantity control device. This fuel injection quantity control device is provided with an injector that injects a fuel supplied to the engine and a control unit that drives the injector. The fuel injection quantity control device calculates an injection quantity command value as the amount of the fuel required to be injected from the injector in one engine cycle based on an engine operation state and performs the injection of the fuel equivalent in amount to the injection quantity command value by energization of the injector. With regard to the execution of the fuel injection equivalent in amount to the injection quantity command value, it is conceivable that the fuel injection is performed by being divided into a main injection and a sub injection (pilot injection, after-injection, and the like) that is a fuel injection smaller in amount than the main injection.

Japanese Patent Application Publication No. 2013-238203 discloses a monitoring device that monitors the presence or absence of an abnormality of the fuel injection quantity control device. This monitoring device calculates a monitor injection quantity as the amount of the fuel that is actually injected based on an energization time monitor value of the injector for each fuel injection and determines the presence or absence of the abnormality of the fuel injection quantity control device based on a comparison between a total value of the monitor injection quantities after the one cycle of the engine and the injection quantity command value. In other words, the fuel injection quantity control device is determined to be abnormal when the total value of the monitor injection quantities and the injection quantity command value significantly diverge from each other. In some cases, a correction that is equivalent to a predetermined correction amount is added to each of the amount of the fuel injected by the main injection and the amount of the fuel injected by the sub injection, examples of the correction including a correction for removing a deviation of the fuel injection quantity from an appropriate value which is attributable to an individual difference between the injectors. In this case, the correction amount is removed from the monitor injection quantity that is calculated for each fuel injection, and then the total value of the monitor injection quantities in one engine cycle is calculated. Then, the total value and the injection quantity command value are compared to each other.

SUMMARY OF THE INVENTION

When the amount of the fuel that is injected from the injector is very small, that is, when the energization time of the injector for each fuel injection is very short, a relationship between structures of the injectors might cause the amount of the fuel injected with respect to the energization time to have an unintended value. As a correction thereagainst, a micro-injection correction is added to the energization time command value for the injector during the execution of the sub injection. The micro-injection correction is not added to the energization time command value for the injector during the execution of the main injection.

In a case where the micro-injection correction is added only to the energization time command value for the injector during the execution of the sub injection and is not added to the energization time command value for the injector during the execution of the main injection as described above, the determination of the presence or absence of the abnormality of the fuel injection quantity control device by the monitoring device might be hampered.

Specifically, when the monitor injection quantity is calculated based on the energization time monitor value of the injector for each fuel injection, only a rise and fall in a current that flows through the injector is detected, and thus it is impossible to discern whether the energization at that time is because of the main injection or because of the sub injection and it is impossible to discern whether the calculated monitor injection quantity is that during the sub injection or that during the main injection when the monitor injection quantity is calculated based on the energization time monitor value of the injector for each fuel injection. Accordingly, it is difficult to remove the amount of the micro-injection correction from the monitor injection quantity that is calculated during the sub injection.

Since it is difficult to remove the micro-injection correction amount from the monitor injection quantity that is calculated during the sub injection as described above, the total value of the monitor injection quantities in the one cycle of the engine continues to be affected by the micro-injection correction. As a result, a result of the determination of the presence or absence of the abnormality of the fuel injection quantity control device based on the comparison between the total value of the monitor injection quantities and the injection quantity command value might be prone to an error.

The invention provides a monitoring device for a fuel injection quantity control device that is capable of suppressing an error relating to a result of a determination of the presence or absence of an abnormality of the fuel injection quantity control device.

According to an aspect of the invention, there is provided a monitoring device for a fuel injection quantity control device, the fuel injection quantity control device including an injector configured to inject a fuel supplied to an engine and a control unit configured to i) drive the injector, ii) calculate an injection quantity command value as the amount of the fuel required to be injected from the injector in one cycle based on an engine operation state, iii) execute the injection of the fuel equivalent in amount to the injection quantity command value by energization of the injector such that the fuel injection is divided into a main injection and a sub injection and executed, the sub injection being the injection of the fuel smaller in amount than the main injection, and iv) add a micro-injection correction to an energization time command value for the injector for performing the sub injection, the monitoring device including an electronic control unit configured to i) calculate monitor injection quantities as the amounts of the fuel actually injected by the main injection and the sub injection based on an energization time monitor value of the injector for each of the main injection and the sub injection, ii) execute a correction processing for the monitor injection quantity such that the amount of the micro-injection correction is removed from the monitor injection quantity when the monitor injection quantity is below a determined determination value and the removal of the micro-injection correction amount from the monitor injection quantity is not performed when the monitor injection quantity is at least the determination value, and ii) execute a correction processing for the monitor injection quantity such that the amount of the micro-injection correction is removed from the monitor injection quantity when the monitor injection quantity is below a determined determination value and the removal of the micro-injection correction amount from the monitor injection quantity is not performed when the monitor injection quantity is at least the determination value, and iii) determine a presence or absence of an abnormality of the fuel injection quantity control device based on a comparison between a total value of the monitor injection quantities after the correction processing in the one cycle of the engine and the injection quantity command value.

According to this aspect, the micro-injection correction is added only to the energization time command value for the injector for performing the sub injection having a smaller fuel injection quantity. Accordingly, it can be estimated, based on a magnitude of the monitor injection quantity calculated for each fuel injection, whether the fuel injection correlated with the monitor injection quantity is the sub injection in which the micro-injection correction is added to the energization time command value for the injector or the main injection in which the micro-injection correction is not added to the energization time command value for the injector. In a case where it is highly probable that the monitor injection quantity calculated for each fuel injection is at least the determination value and the fuel injection correlated with the monitor injection quantity is the main injection, the removal of the micro-injection correction amount from the monitor injection quantity is not performed. In a case where it is highly probable that the monitor injection quantity calculated for each fuel injection is below the determination value and the fuel injection correlated with the monitor injection quantity is the sub injection, the removal of the micro-injection correction amount from the monitor injection quantity can be performed. Then, an effect that the micro-injection correction has on the total value of the monitor injection quantities after the processing by the correction removing unit in the one cycle of the engine can be inhibited from remaining, and an erroneous determination of the presence or absence of the abnormality of the fuel injection quantity control device that is attributable to the effect can be suppressed.

The electronic control unit may be configured to determine that the fuel injection quantity control device is abnormal based on the total value of the monitor injection quantities after the correction processing in the one cycle of the engine and the injection quantity command value diverging from each other by a margin of at least a predetermined value.

In a case where the sub injection is performed at least twice in one engine cycle, the fuel injection equivalent in amount to the injection quantity command value is performed by being divided into the main injection and the sub injections performed at least twice. When the sub injection is performed at least twice as described above, it is even more difficult to discern whether the monitor injection quantity calculated based on the energization time monitor value for the injector for each fuel injection is that pertaining to the main injection or that pertaining to the sub injection. However, even in such a situation, the micro-injection correction amount can be removed from the monitor injection quantity in a case where it is highly probable that the monitor injection quantity for each fuel injection is attributable to the sub injection.

The electronic control unit may be configured to i) determine that the monitor injection quantity pertains to the sub injection when the calculated monitor injection quantity is below the determination value, and ii) determine that the monitor injection quantity pertains to the main injection when the calculated monitor injection quantity is at least the determination value.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
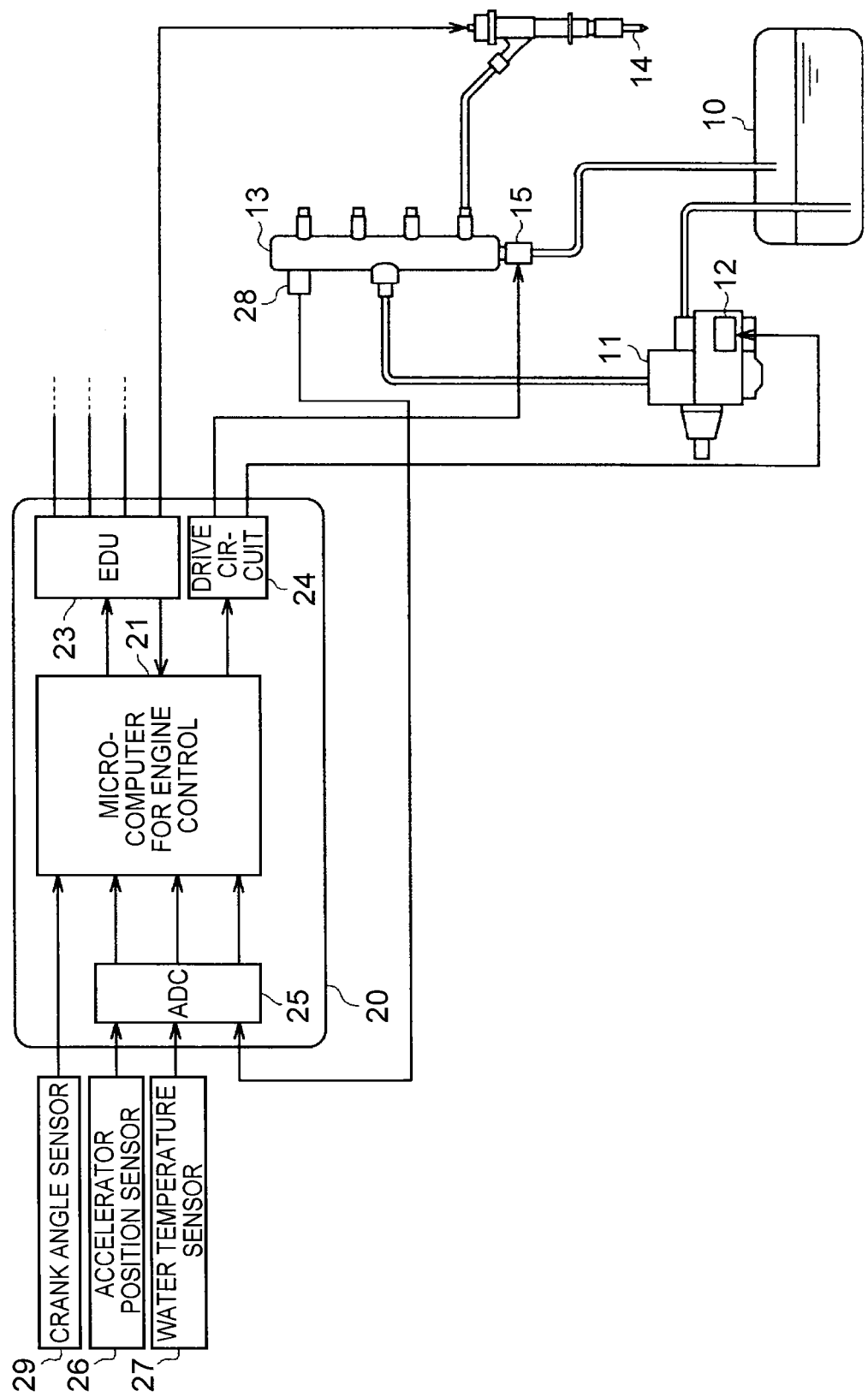
FIG. 1 is a schematic diagram illustrating configurations of a monitoring device for a fuel injection quantity control device and a fuel supply system for an engine to which the device is applied.

Hereinafter, an embodiment of a monitoring device for a fuel injection quantity control device will be described with reference to FIGS. 1 to 7. FIG. 1 shows a fuel supply system for a diesel engine to which the fuel injection quantity control device of this embodiment is applied. A fuel pump 11 is disposed in the fuel supply system for this engine. The fuel pump 11 pressurizes and discharges a fuel that is pumped up from a fuel tank 10. A pressure-adjusting valve 12 for adjusting the pressure of the discharged fuel is installed in the fuel pump 11. The fuel that is discharged by the fuel pump 11 is pumped to a common rail 13 and is stored therein. Then, the fuel that is stored in the common rail 13 is distributed and supplied to injectors 14 of respective cylinders. A pressure-reducing valve 15 is arranged in the common rail 13. The pressure-reducing valve 15 lowers the pressure of the fuel in the common rail 13 (rail pressure) by allowing the fuel in the common rail 13 to return to the fuel tank 10.

The engine that is provided with the fuel supply system is controlled by an electronic control unit (ECU) 20. The electronic control unit 20 is provided with a microcomputer 21 that performs various types of calculation processing relating to the engine control. In addition, the electronic control unit 20 is provided with an electronic driving unit (EDU) 23 that drives the injectors 14 of the respective cylinders in response to a command from the microcomputer 21. In addition, a drive circuit 24 is disposed in the electronic control unit 20. The drive circuit 24 drives the pressure-adjusting valve 12 and the pressure-reducing valve 15 in response to a command from the microcomputer 21. When the injectors 14 are driven through the microcomputer 21 and the EDU 23, the electronic control unit 20 functions as a control unit for driving the injectors 14.

Detection signals of an accelerator position sensor 26 that detects an accelerator operation amount Accp, a water temperature sensor 27 that detects an engine water temperature Thw, a rail pressure sensor 28 that detects a rail pressure Pcr, a crank angle sensor 29 that outputs a pulsed crank angle signal in response to a rotation of an engine output shaft, and the like are input to the electronic control unit 20. The detection signals of the accelerator position sensor 26, the water temperature sensor 27, and the rail pressure sensor 28 are input to the microcomputer 21 after being converted into digital signals by an AD converter (ADC) 25 that is arranged in the electronic control unit 20. The crank angle signal that is output by the crank angle sensor 29 is directly input to the microcomputer 21.

Figure 2:
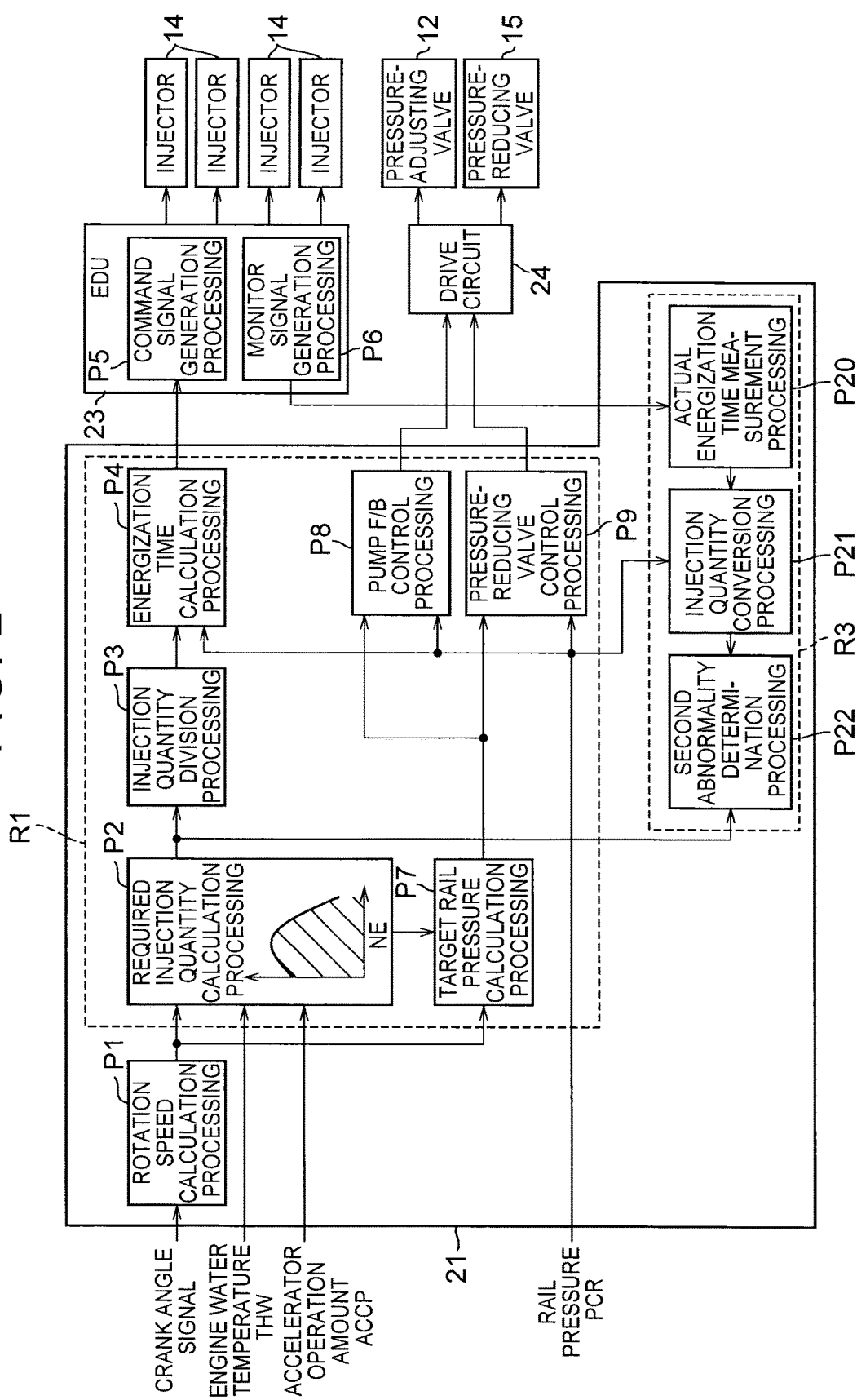
FIG. 2 is a drawing illustrating a fuel injection quantity control by the fuel injection quantity control device and a flow of a processing relating to a monitoring of the device.

A fuel injection quantity control that is performed as a part of the engine control through the electronic control unit 20 will be described in detail below. As illustrated in FIG. 2, the microcomputer 21 performs the processing of a fuel injection quantity control routine R1 during the fuel injection quantity control. The fuel injection quantity control routine R1 consists of a required injection quantity calculation processing P2, an injection quantity division processing P3, and an energization time calculation processing P4.

In the required injection quantity calculation processing P2, a required injection quantity Qfin is calculated as an injection quantity command value, which is the amount of the fuel that should be injected from the injectors 14 in one engine cycle, based on an engine rotation speed Ne, the accelerator operation amount Accp, and the like. In the first step of the calculation of the required injection quantity Qfin, a base injection quantity Qbse is calculated from the engine rotation speed Ne and the accelerator operation amount Accp. The calculation of the base injection quantity Qbse is performed based on a map for the base injection quantity calculation that is stored in the microcomputer 21. A relationship of the engine rotation speed Ne and the accelerator operation amount Accp to the base injection quantity Qbse is stored in this map. The required injection quantity Qfin is calculated by a correction in accordance with the engine water temperature Thw and the like being applied to the calculated base injection quantity Qbse.

The engine rotation speed Ne is calculated through a rotation speed calculation processing P1. In the rotation speed calculation processing P1, the engine rotation speed Ne is calculated based on the crank angle signal that is input from the crank angle sensor 29.

In the injection quantity division processing P3, the required injection quantity Qfin is allocated to the respective ones of a pilot injection, a main injection, and an after-injection, and an injection quantity (required value) of each of the injections is determined thereby. Among these injections, the pilot injection and the after-injection are sub injections each having a fuel injection quantity smaller than that of the main injection. The number of divisions of the fuel injection and distribution ratios for the injection quantities of the respective injections are determined in accordance with an engine operating situation at that time. In this example, the sub injection such as the pilot injection and the after-injection is performed at least twice in one engine cycle.

Each of the pilot injection, the main injection, and the after-injection is affected by a pulsation of the rail pressure Pcr by the immediately preceding injection, and thus a correction for removing the effect (undulation correction) is executed. This undulation correction is realized by an undulation correction term H prepared for the injection quantity (required value) of each injection being added to the required value. The manner in which the pulsation occurs depends on the injection quantity of the immediately preceding injection, and thus the undulation correction terms H that are correlated with the injection quantities (required values) of the respective injections are set in accordance with the injection quantities (required values) of the immediately preceding injections.

In the energization time calculation processing P4, an energization time command value Tau is calculated as a command value for drive current energization time for the injectors 14 regarding each injection such that the injection quantity (required value) of each injection after the addition of the undulation correction is obtained. The energization time command value Tau for each injection is obtained based on the injection quantity (required value) of each injection and the rail pressure Pcr. Various types of corrections are added to the energization time command values Tau that are obtained in this manner and correlated with the respective injections.

Specifically, an individual difference correction for removing a deviation of the fuel injection quantity from an appropriate value that is attributable to an individual difference between the injectors 14 is added to each of the energization time command values Tau correlated with the respective injections such as the main injection, the pilot injection, and the after-injection. The individual difference correction is realized by an individual difference correction term H1 being added to each of the energization time command values Tau correlated with the respective injections. The individual difference correction term H1 is determined based on the energization time (energization time command value Tau) during the realization of the correlated injection and the rail pressure Pcr during that injection.

In the sub injection such as the pilot injection and the after-injection, the amount of the fuel that is injected from the injectors 14 is very small. The energization time of the injectors 14 should be very short for the amount of the fuel that is injected from the injectors 14 to be very small as described above. In this case, a relationship between structures of the injectors 14 might cause the amount of the fuel injected with respect to the energization time to have an unintended value. As a correction thereagainst, a micro-injection correction is added to the energization time command value Tau correlated with the sub injection. The micro-injection correction is realized by a micro-injection correction term H2 being added to the energization time command value Tau correlated with the sub injection.

The micro-injection correction term H2 is a value that is learned through the following learning processing in response to the aging of the injectors 14. This learning processing is carried out every time the traveling distance of a vehicle in which the engine is mounted increases by a predetermined amount. Specifically, a very small amount of the fuel is injected from the injectors 14 and a fluctuation of the engine rotation speed Ne at that time is monitored amid a deceleration of the vehicle and the execution of an engine fuel cut. The micro-injection correction term H2 is increased or decreased in accordance with the degree of divergence between the monitored fluctuation of the engine rotation speed Ne and a reference state of the fluctuation, and the learning of the micro-injection correction term H2 is performed through the increase or decrease. The micro-injection correction term H2 that is learned in this manner is stored in a non-volatile memory of the microcomputer 21. The micro-injection correction term H2 that is stored in the memory is used in the micro-injection correction of the energization time command value Tau correlated with the sub injection.

The microcomputer 21 sends the EDU 23 a command of the energization time command value Tau correlated with each injection after the addition of the corrections described above. After receiving the command, the EDU 23 performs a command signal generation processing P5 for command signal generation based on the energization time command value Tau for each commanded injection. The command signal is generated such that its signal level rises to a level at which an electromagnetic valve of the injector 14 can be opened with an initiation of the energization and its signal level falls to a level at which the opening of the valve cannot be maintained as a result of a termination of the energization. The generated command signal is output to the injector 14 of the correlated cylinder.

The EDU 23 also performs a monitor signal generation processing P6. The monitor signal generation processing P6 is to detect electric currents that flow through the respective electromagnetic valves of the injectors 14 and generate an injection monitor signal from a result of the detection. The injection monitor signal is generated as a pulsed signal that has a signal level of "Lo" in a period when the electromagnetic valve of the injector 14 is actually energized with a drive current and has a signal level of "Hi" in a period when the electromagnetic valve of the injector 14 is energized with no drive current. The generated injection monitor signal is output to the microcomputer 21.

The microcomputer 21 performs a target rail pressure calculation processing P7 for calculating a target rail pressure based on the engine rotation speed Ne that is calculated in the rotation speed calculation processing P1 and the required injection quantity Qfin that is calculated in the required injection quantity calculation processing P2. Then, the microcomputer 21 carries out a pump feedback (F/B) control processing P8 and a pressure-reducing valve control processing P9 based on the calculated target rail pressure and the actual rail pressure Pcr that is detected by the rail pressure sensor 28.

In the pump F/B control processing P8, a target opening degree of the pressure-adjusting valve 12 is calculated in accordance with a deviation between the target rail pressure and the actual rail pressure Pcr. The calculated target opening degree is output to the drive circuit 24. Then, an adjustment of a discharge pressure of the fuel pump 11 is performed by the drive circuit 24 driving the pressure-adjusting valve 12 such that the target opening degree is obtained.

In the pressure-reducing valve control processing P9, an operation command for the pressure-reducing valve 15 is output to the drive circuit 24 when the actual rail pressure Pcr is higher than the target rail pressure. The drive circuit 24 lowers the rail pressure Pcr by operating the pressure-reducing valve 15 in response to the input of the operation command and discharging the fuel from the common rail 13.

A monitoring routine R3 will be described below. The monitoring routine R3 is to monitor whether or not the fuel injection quantity control described above is normally performed. In the monitoring routine R3, it is determined whether or not the driving of the injectors 14 based on the result of the calculation of the required injection quantity Qfin is normally performed based on a comparison between a total value of the amounts of the fuel actually injected from the injectors 14 during the respective injections of one engine cycle and the required injection quantity Qfin (injection quantity command value) calculated by the microcomputer 21. When this determination is performed, the electronic control unit 20 plays a role as a determination unit that determines the presence or absence of an abnormality of the fuel injection quantity control device applied to the engine.

The monitoring routine R3 consists of an actual energization time measurement processing P20, an injection quantity conversion processing P21, and an abnormality determination processing P22. In the actual energization time measurement processing P20, the drive current energization time of the injector 14 for each fuel injection is measured as an energization time monitor value INJM based on the injection monitor signal input from the EDU 23. In the injection quantity conversion processing P21, a monitor injection quantity is calculated based on the measured energization time monitor value INJM. The monitor injection quantity is a monitor value of the amount of the fuel injected from the injector 14 for each fuel injection. In the abnormality determination processing P22, it is determined whether or not the driving of the injectors 14 based on the required injection quantity Qfin is normally performed by the total value of the monitor injection quantities in one engine cycle being compared to the required injection quantity Qfin (injection quantity command value) calculated in the fuel injection quantity control routine R1.

Figure 3:
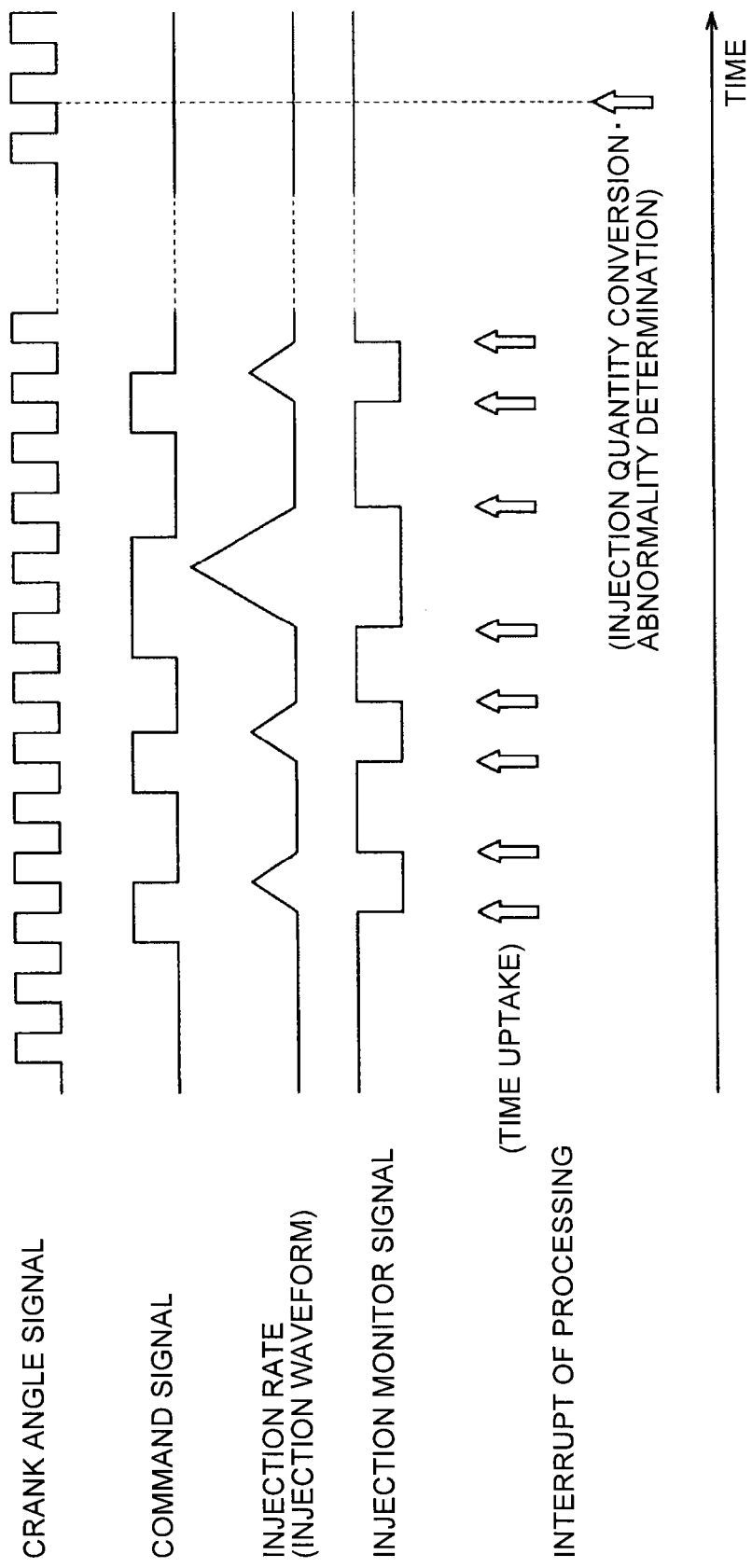
FIG. 3 is a time chart illustrating transitions of a crank angle signal, a command signal, an injection rate, and an injection monitor signal and an interrupt timing of each processing that is performed by the monitoring device of this embodiment.

The actual energization time measurement processing P20 will be described in detail below. FIG. 3 shows an example of transitions of the crank angle signal, the command signal, an injection rate of the injector 14, and the injection monitor signal during the fuel injection. When the signal level of the command signal that is output from the EDU 23 to the injector 14 rises, the drive current that flows through the electromagnetic valve of the injector 14 rises, with a slight delay, to the level at which the electromagnetic valve of the injector 14 can be opened, and then the fuel injection is initiated as illustrated in FIG. 3. Then, the injection monitor signal that is generated by the EDU 23 falls in response to the rise in the drive current. As the signal level of the command signal falls thereafter, the energization of the electromagnetic valve of the injector 14 with the drive current is stopped with a slight delay, and the fuel injection from the injector 14 is stopped. Then, the injection monitor signal rises in response to the stopping of the drive current energization.

As illustrated in FIG. 3, the microcomputer 21 performs time uptake as an interrupt processing correlated with the rise and fall in the injection monitor signal. In other words, the microcomputer 21 acquires the times of the initiation and termination of each injection based on the injection monitor signal. Then, the microcomputer 21 calculates the drive current energization time for each injection as the energization time monitor value INJM from the times of the initiation and termination of each injection.

The injection quantity conversion processing P21 and the abnormality determination processing P22 are carried out, as a crank angle interrupt processing, in a predetermined period following a complete termination of the fuel injection in one engine cycle.

Figure 4:
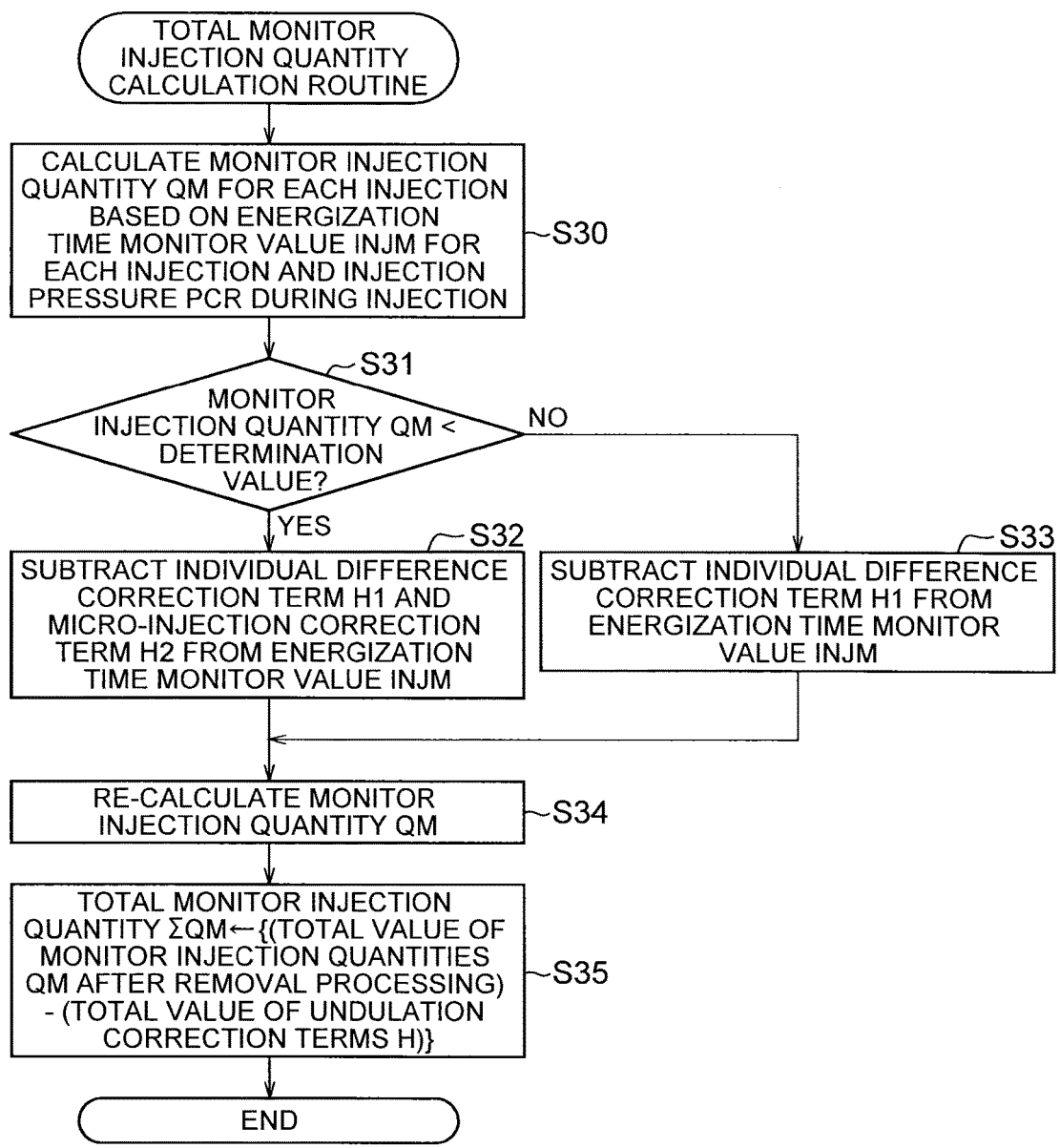
FIG. 4 is a flowchart illustrating a processing procedure of a total monitor injection quantity calculation routine by the monitoring device.

The injection quantity conversion processing P21 will be described in detail below. The injection quantity conversion processing P21 is performed through the processing of a total monitor injection quantity calculation routine that is illustrated in FIG. 4. The processing of this routine is carried out by the microcomputer 21 as the crank angle interrupt processing after the complete termination of the fuel injection from the injector 14 in one engine cycle.

Figure 5:
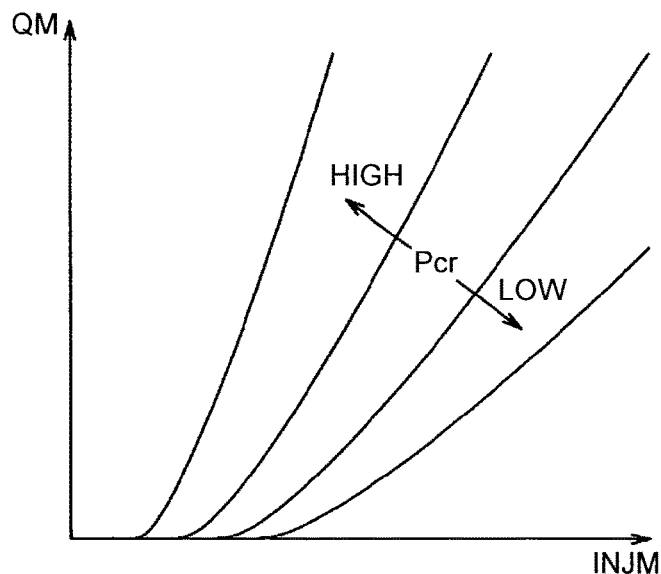
FIG. 5 is a graph illustrating a relationship of an energization time monitor value INJM and an injection pressure Pcrinj to a monitor injection quantity QM.

In Step 30 (S30), which is the first step following the initiation of the processing of this routine, the injection quantity for each injection is calculated as a monitor injection quantity QM based on the energization time monitor value INJM and the injection pressure Pcr (corresponding to the rail pressure Pcr) for each injection as illustrated in FIG. 4. In this case, the microcomputer 21 functions as a calculation unit for calculating the monitor injection quantity QM. A calculation map that shows a relationship of the energization time monitor value INJM and the injection pressure Pcr to the monitor injection quantity QM illustrated in FIG. 5 is stored in the microcomputer 21. The calculation of the monitor injection quantity QM is performed with reference to the calculation map.

In the subsequent step of S31, it is determined whether or not the monitor injection quantity QM for each injection is below a determined determination value. When it is determined in S31 that the monitor injection quantity QM is below the determination value, the individual difference correction term H1 and the micro-injection correction term H2 are subtracted in S32 from the energization time monitor value INJM correlated with the monitor injection quantity QM. When it is determined in S31 that the monitor injection quantity QM is at least the determination value, the individual difference correction term H1 is subtracted in S33 from the energization time monitor value INJM correlated with the monitor injection quantity QM. The determination value is set to a value at which the monitor injection quantity QM can be determined to pertain to the sub injection when the monitor injection quantity QM is below the determination value and the monitor injection quantity QM can be determined to pertain to the main injection when the monitor injection quantity QM is at least the determination value.

In the subsequent step of S34, the monitor injection quantity QM is re-calculated by the use of the energization time monitor value INJM calculated in S31 to S33. When the processing of S31 to S34 is performed, the microcomputer 21 functions as a correction removing unit that executes a processing for removing the amounts of the corrections by the individual difference correction term H1 and the micro-injection correction term H2 from the monitor injection quantity QM (hereinafter, referred to as a removal processing). In the processing (S31 to S34) by the correction removing unit, the micro-injection correction amount is removed from the monitor injection quantity QM when the monitor injection quantity QM is below the determination value and the removal of the micro-injection correction amount from the monitor injection quantity is not performed when the monitor injection quantity QM is at least the determination value.

Then, in S35, the monitor injection quantities QM of the respective injections after the removal processing in one engine cycle are added to each other, and a value that is obtained by subtracting a total value of the undulation correction terms H correlated with the respective injections from the total value becomes a total monitor injection quantity ΣQM. Then, the processing of the current session of this routine is terminated.

Figure 6:
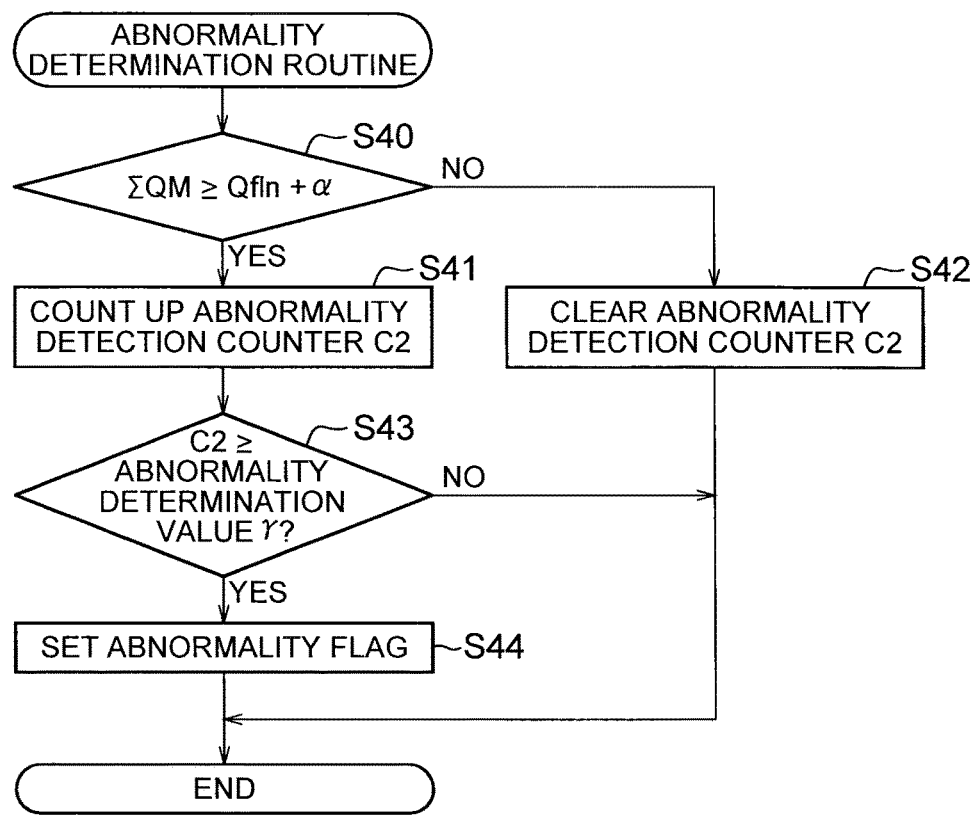
FIG. 6 is a flowchart illustrating a processing procedure of an abnormality determination routine by the monitoring device.

The abnormality determination processing P22 will be described in detail below. The abnormality determination processing P22 is performed through the processing of an abnormality determination routine that is illustrated in FIG. 6. The processing of this routine, which follows the processing of the total monitor injection quantity calculation routine described above, is executed by the microcomputer 21.

In S40, which is the first step following the initiation of the processing of this routine, it is determined whether or not the total monitor injection quantity ΣQM that is calculated in the injection quantity conversion processing P21 and the required injection quantity Qfin that is calculated in the fuel injection quantity control routine R1 diverge from each other as illustrated in FIG. 6. In this embodiment, only a case where the actual fuel injection quantity exceeds an original quantity is regarded as an abnormality requiring a fail-safe processing. Accordingly, herein, the divergence is determined to have occurred in a case where the total monitor injection quantity ΣQM exceeds the required injection quantity Qfin by a margin of at least a predetermined value α.

In the event of no divergence (S40: NO), the value of an abnormality detection counter C2 is cleared in S41, and then the processing of the current session of this routine is terminated. In the event of a divergence (S40: YES), the value of the abnormality detection counter C2 is counted up in S42. Accordingly, the value of the abnormality detection counter C2 gradually increases as a state where the total monitor injection quantity ΣQM and the required injection quantity Qfin diverge from each other continues.

In a case where it is determined that the total monitor injection quantity ΣQM and the required injection quantity Qfin diverge from each other (S40: YES), it is determined in S43 whether or not the abnormality detection counter C2 is at least a prescribed abnormality determination value γ. When it is determined that the abnormality detection counter C2 is below the abnormality determination value γ (S43: NO), the processing of the current session of this routine is terminated as it is.

When it is determined that the abnormality detection counter C2 is at least the abnormality determination value γ (S43: YES), an abnormality flag for determining the presence or absence of the abnormality of the fuel injection quantity control device is set in S44, and then the processing of the current session of this routine is terminated. When the abnormality flag is set, the microcomputer 21 determines that the abnormality of the fuel injection quantity control device is present. Then, the microcomputer 21 pauses the cylinder subjected to the abnormality as a fail-safe processing, that is, stops the fuel injection for that cylinder.

Figure 7:
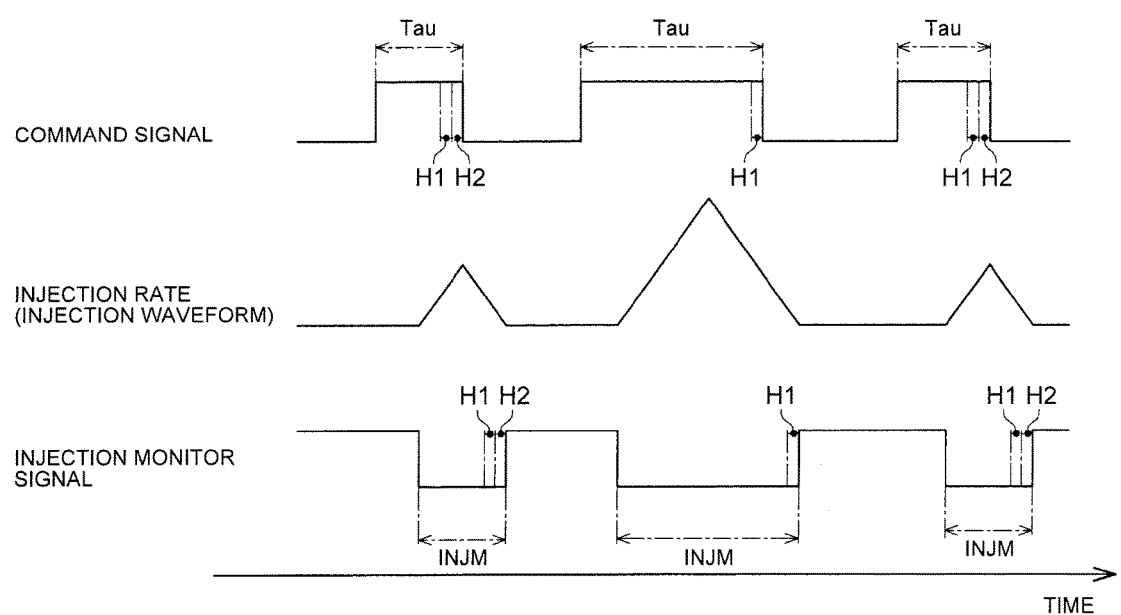
FIG. 7 is a time chart illustrating the transitions of the command signal, the injection rate, and the injection monitor signal.

An effect of the monitoring device for the fuel injection quantity control device will be described below. FIG. 7 shows the command signal regarding the energization of the injector 14, a change in the injection rate (injection waveform) attributable to the energization of the injector 14 based on the command signal, and a transition of the injection monitor signal based on the energization of the injector 14 pertaining to a case where the pilot injection, the main injection, and the after-injection are performed in one engine cycle.

As illustrated in FIG. 7, the correction by the individual difference correction term H1 is added to each of the energization time command value Tau for the injector 14 pertaining to a case where the main injection is performed and the energization time command value Tau for the injector 14 pertaining to a case where the sub injection such as the pilot injection and the after-injection is performed. The correction by the micro-injection correction term H2, meanwhile, is added only to the energization time command value Tau for the injector 14 pertaining to a case where the sub injection such as the pilot injection and the after-injection is performed and is not added to the energization time command value Tau for the injector 14 pertaining to a case where the main injection is performed.

During the determination of the presence or absence of the abnormality of the fuel injection quantity control device, the monitor injection quantity QM is calculated based on the energization time monitor value INJM for the injector 14 (refer to FIG. 7). During the measurement of the energization time monitor value INJM for the calculation of the monitor injection quantity QM, only the rise and fall in the current that flows through the injector 14 is detected. Accordingly, during the measurement of the energization time monitor value INJM, it is impossible to discern whether the energization of the injector 14 during the measurement is because of the main injection or because of the sub injection and it is impossible to discern whether the micro-injection correction term H2 is included or not in the energization time monitor value INJM. Accordingly, it is difficult to remove the amount of the correction by the micro-injection correction term H2 from the monitor injection quantity QM that is calculated based on the energization time monitor value INJM during the sub injection.

When it is impossible to remove the amount of the correction by the micro-injection correction term H2 from the monitor injection quantity QM that is calculated during the sub injection, the effect that the micro-injection correction term H2 has on the total value of the monitor injection quantities (total monitor injection quantity ΣQM) in one engine cycle remains. As a result, a result of the determination of the presence or absence of the abnormality of the fuel injection quantity control device based on the comparison between the total monitor injection quantity ΣQM and the required injection quantity Qfin (injection quantity command value) might be prone to an error. As a result, the abnormality flag might be erroneously set when the fuel injection quantity control device is normal, and the fail-safe processing might be unnecessarily executed. In addition, the abnormality flag might not be set when the fuel injection quantity control device is actually abnormal and a necessary fail-safe processing might not be executed.

The correction equivalent to the micro-injection correction term H2 is added only to the energization time command value Tau for the injector 14 for performing the sub injection having a smaller fuel injection quantity and is not added to the energization time command value Tau for the injector 14 for performing the main injection having a larger fuel injection quantity. Accordingly, it can be estimated, based on the magnitude of the monitor injection quantity QM calculated for each fuel injection, whether the fuel injection correlated with the monitor injection quantity QM is the sub injection in which the correction equivalent to the micro-injection correction term H2 is added to the energization time command value Tau for the injector 14 or the main injection in which the correction is not added.

When the monitor injection quantity QM is below the determination value, it is determined based on the estimation that the fuel injection correlated with the monitor injection quantity QM is the sub injection. In this case, the micro-injection correction term H2 is subtracted from the energization time monitor value INJM for the calculation of the monitor injection quantity QM, and then the monitor injection quantity QM is re-calculated by the use of the energization time monitor value INJM after the subtraction. In this manner, the amount of the correction by the micro-injection correction term H2 is removed from the monitor injection quantity QM. When the monitor injection quantity QM is at least the determination value, it is determined that the fuel injection correlated with the monitor injection quantity QM is the main injection, the subtraction of the individual difference correction term H1 from the energization time monitor value INJM for the calculation of the monitor injection quantity QM is performed whereas the micro-injection correction term H2 is not subtracted from the energization time monitor value INJM for the calculation of the monitor injection quantity QM, and then the monitor injection quantity QM is re-calculated by the use of the energization time monitor value INJM after the subtraction. In this case, the removal of the amount of the correction by the micro-injection correction term H2 from the monitor injection quantity QM described above is not performed.

Then, the effect that the correction equivalent to the micro-injection correction term H2 has on the total value of the monitor injection quantities QM (total monitor injection quantity ΣQM) after the removal processing in one engine cycle does not remain. As a result, an erroneous determination of the presence or absence of the abnormality of the fuel injection quantity control device that is attributable to the effect is suppressed.

The following effects are achieved by this embodiment described above.

(1) An erroneous determination result can be suppressed when the presence or absence of the abnormality of the fuel injection quantity control device is determined based on the comparison between the total monitor injection quantity ΣQM and the required injection quantity Qfin.

(2) In a case where the sub injection is performed at least twice in one engine cycle, it is even more difficult to discern whether the monitor injection quantity QM calculated based on the energization time monitor value INJM is that pertaining to the main injection or that pertaining to the sub injection. However, even in such a situation, the amount of the correction by the micro-injection correction term H2 can be removed from the monitor injection quantity QM based on a determination that the monitor injection quantity QM is below the determination value.

The above-described embodiment can be modified as follows.

During the subtraction of the individual difference correction term H1 and the micro-injection correction term H2 from the energization time monitor value INJM, guard processing may be performed on the correction terms H1, H2 such that the correction terms H1, H2 are limited to ranges capable of actually having the correction terms H1, H2. In this case, the correction terms H1, H2 can be maintained within the appropriate ranges through the guard processing even when the correction terms H1, H2 are subjected to an abnormality due to a memory error or the like during the acquisition of the individual difference correction term H1 and the micro-injection correction term H2 for the subtraction described above, and thus the monitoring function of the fuel injection quantity control device can be intact.

During the subtraction of the total value of the undulation correction terms H from the total value of the monitor injection quantities QM for the respective injections after the removal processing, guard processing may be performed on the undulation correction terms H such that the undulation correction terms H are limited to ranges capable of actually having the correction terms H. Even in this case, the correction term H1 can be maintained within an appropriate range through the guard processing even when the correction term H is subjected to an abnormality due to a memory error or the like during the acquisition of the undulation correction term H for the subtraction described above, and thus the monitoring function of the fuel injection quantity control device can be intact.

The invention may be applied to a case where only the pilot injection or only the after-injection is executed as the sub injection.

The pilot injection may be performed at least twice or the after-injection may be performed at least twice in one engine cycle.

The determination value described above can be appropriately changed.

In the embodiment described above, only a case where the actual fuel injection quantity exceeds the original quantity is determined as the presence of an abnormality of the fuel injection quantity control device. However, if necessary, a case where the actual fuel injection quantity is smaller than the original quantity may be determined as the presence of an abnormality of the fuel injection quantity control device. For example, the determination of the abnormality can be made based on a determination in Step S40 in FIG. 6 of whether or not the total monitor injection quantity $\Sigma QM$ is smaller than the total monitor injection quantity $\Sigma QM$ by a margin of at least the predetermined value $\alpha$.

In the embodiment described above, the pause of the abnormal cylinder is performed as the fail-safe processing when the abnormality of the fuel injection quantity control device is confirmed. However, the content of the fail-safe processing may be modified.

What is claimed is:

1. A monitoring device for a fuel injection quantity control device, the fuel injection quantity control device including an injector configured to inject a fuel supplied to an engine and a control unit configured to i) drive the injector, ii) calculate an injection quantity command value as an amount of the fuel required to be injected from the injector in one cycle based on an engine operation state, iii) execute the injection of the fuel equivalent in amount to the injection quantity command value by energization of the injector such that the fuel injection is divided into a main injection and a sub injection and executed, the sub injection being the injection of the fuel smaller in amount than the main injection, and iv) add a micro-injection correction to an energization time command value for the injector for performing the sub injection, the monitoring device comprising an electronic control unit configured to:
   i) calculate monitor injection quantities as amounts of the fuel actually injected by the main injection and the sub injection based on an energization time monitor value of the injector for each of the main injection and the sub injection,
   ii) execute a correction processing for a monitor injection quantity such that an amount of the micro-injection correction is removed from the monitor injection quantity by subtracting the amount of the micro-injection correction from the energization time monitor value for recalculation of the monitor injection quantity when the monitor injection quantity is below a determined determination value and the removal of the micro-injection correction amount from the monitor injection quantity is not performed when the monitor injection quantity is equal to or larger than the determination value, and
   iii) determine a presence or absence of an abnormality of the fuel injection quantity control device based on a comparison between a total value of the monitor injection quantities after the correction processing in the one cycle of the engine and the injection quantity command value.

2. The monitoring device according to claim 1, wherein the electronic control unit is configured to determine that the fuel injection quantity control device is abnormal based on the total value of the monitor injection quantities after the correction processing in the one cycle of the engine and the injection quantity command value diverging from each other by a margin of at least a predetermined value.

3. The monitoring device according to claim 1,
   wherein the control unit is configured to perform the sub injection at least twice in the one cycle of the engine, and
   wherein the control unit is configured to perform the fuel injection equivalent in amount to the injection quantity command value by dividing the fuel injection into the main injection and a plurality of sub injections.

4. A monitoring device for a fuel injection quantity control device, the fuel injection quantity control device including an injector configured to inject a fuel supplied to an engine and a control unit configured to i) drive the injector, ii) calculate an injection quantity command value as an amount of the fuel required to be injected from the injector in one cycle based on an engine operation state, iii) execute the injection of the fuel equivalent in amount to the injection quantity command value by energization of the injector such that the fuel injection is divided into a main injection and a sub injection and executed, the sub injection being the injection of the fuel smaller in amount than the main injection, and iv) add a micro-injection correction to an energization time command value for the injector for performing the sub injection, the monitoring device comprising:
   an electronic control unit configured to
   i) calculate monitor injection quantities as amounts of the fuel actually injected by the main injection and the sub injection based on an energization time monitor value of the injector for each of the main injection and the sub injection,
   ii) execute a correction processing for a monitor injection quantity such that an amount of the micro-injection correction is removed from the monitor injection quantity when the monitor injection quantity is below a determined determination value and the removal of the micro-injection correction amount from the monitor injection quantity is not performed when the monitor injection quantity is equal to or larger than the determination value,
   iii) determine a presence or absence of an abnormality of the fuel injection quantity control device based on a comparison between a total value of the monitor injection quantities after the correction processing in the one cycle of the engine and the injection quantity command value,
   iv) determine that the monitor injection quantity pertains to the sub injection when the calculated monitor injection quantity is below the determination value, and v) determine that the monitor injection quantity pertains to the main injection when the calculated monitor injection quantity is equal to or larger than the determination value.

\* \* \* \* \*